(12) United States Patent
Hall et al.

(10) Patent No.: US 7,692,140 B1
(45) Date of Patent: Apr. 6, 2010

(54) DOWNHOLE COVER

(76) Inventors: David R. Hall, 2185 S. Larsen Pkwy., Provo, UT (US) 84606; Paula Turner, 2185 S. Larsen Pkwy., Provo, UT (US) 84606; Scott Woolston, 2185 S. Larsen Pkwy., Provo, UT (US) 84606; Nathan Nelson, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 12/339,799

(22) Filed: Dec. 19, 2008

Related U.S. Application Data

(63) Continuation of application No. 12/339,388, filed on Dec. 19, 2008.

(51) Int. Cl.
*G01V 5/10* (2006.01)
(52) U.S. Cl. .................................... 250/269.4
(58) Field of Classification Search ............... 250/269.4
See application file for complete search history.

(56) References Cited

U.S. PATENT DOCUMENTS

| | | | |
|---|---|---|---|
| 2,648,780 A | 8/1953 | Herzog | |
| 2,755,390 A | 7/1956 | Teschmann | |
| 3,030,511 A * | 4/1962 | Scherbatskoy | 250/264 |
| 3,032,658 A | 5/1962 | Youmans | |
| 3,038,075 A | 6/1962 | Youmans | |
| 3,389,257 A | 6/1968 | Caldwell | |
| 3,521,065 A | 7/1970 | Locke | |
| 3,617,746 A | 11/1971 | Janssen | |
| 3,885,160 A | 5/1975 | Dillingham | |
| 4,226,116 A | 10/1980 | Denison | |
| 4,596,926 A | 6/1986 | Coope | |
| 4,685,895 A | 8/1987 | Hatten | |
| 4,698,501 A | 10/1987 | Paske | |
| 4,705,944 A | 11/1987 | Coope | |
| 4,879,463 A | 11/1989 | Wraight | |
| 4,996,017 A | 2/1991 | Ethridge | |
| 5,175,429 A | 12/1992 | Hall | |
| 5,242,020 A | 9/1993 | Cobern | |
| 5,250,806 A | 10/1993 | Rhein-Knudsen | |
| 5,363,931 A | 11/1994 | Moriarty | |
| 5,789,752 A | 8/1998 | Mickael | |
| 5,825,024 A * | 10/1998 | Badruzzaman | 250/269.6 |
| 6,064,063 A | 5/2000 | Mickael | |
| 6,173,793 B1 | 1/2001 | Thompson | |
| 6,179,066 B1 | 1/2001 | Nasr | |
| 6,202,752 B1 * | 3/2001 | Kuck et al. | 166/298 |
| 6,230,557 B1 | 5/2001 | Ciglenec | |
| 6,237,404 B1 | 5/2001 | Crary | |
| 6,272,434 B1 | 8/2001 | Wisler | |
| 6,516,898 B1 | 2/2003 | Krueger | |
| 6,564,883 B2 | 5/2003 | Fredericks | |

(Continued)

*Primary Examiner*—David P Porta
*Assistant Examiner*—Marcus H Taningco
(74) *Attorney, Agent, or Firm*—Tyson J. Wilde

(57) ABSTRACT

In one aspect of the invention, a downhole tool string component comprises a tubular body with a first and a second tool joint adapted to connect to adjacent tool string components, and a central bore adapted to pass drilling mud between the joints. A sleeve circumferentially disposed about an outer surface of the tubular body. The sleeve is rigidly attached to the outer surface at first and second sleeve ends and forming at least three stabilizer blades. A nuclear source and at least one nuclear detector are disposed within a gap formed between the inner surface of the sleeve and the outer surface of the tubular body.

16 Claims, 17 Drawing Sheets

U.S. PATENT DOCUMENTS

| | | |
|---|---|---|
| 6,622,803 B2 | 9/2003 | Harvey |
| 6,666,285 B2 | 12/2003 | Jones |
| 6,700,115 B2 | 3/2004 | Mickael |
| 6,781,115 B2 | 8/2004 | Stoller |
| 6,936,812 B2 | 8/2005 | Odom |
| 7,185,715 B2 | 3/2007 | Krueger |
| 7,284,605 B2 | 10/2007 | Clark |
| 7,299,867 B2 | 11/2007 | Hall |
| 2002/0153138 A1* | 10/2002 | Ferg ............................ 166/285 |
| 2002/0185314 A1* | 12/2002 | Cargill et al. ................. 175/57 |
| 2003/0075334 A1* | 4/2003 | Haugen et al. .............. 166/313 |
| 2005/0028586 A1* | 2/2005 | Smits et al. ............... 73/152.14 |
| 2005/0051718 A1 | 3/2005 | Ellis |
| 2005/0083064 A1* | 4/2005 | Homan et al. ............... 324/347 |
| 2007/0119589 A1* | 5/2007 | Hall et al. ................. 166/242.6 |
| 2007/0241275 A1 | 10/2007 | Guo |

* cited by examiner

1400

```
┌─────────────────────────────────────────────────────────────────────────┐
│ Providing a downhole drill string comprising a drill bit, a plurality of interconnected drill │
│ string component, a pulse neutron generator and a nuclear detector disposed within │
│ stabilizer assembly associated with one of the drill string components, and; │
│                                                                    1401 │
└─────────────────────────────────────────────────────────────────────────┘

┌─────────────────────────────────────────────────────────────────────────┐
│         Providing a surface processing element capable of calculating downhole │
│                              measurement;                          1402 │
└─────────────────────────────────────────────────────────────────────────┘

┌─────────────────────────────────────────────────────────────────────────┐
│     Providing a network connecting the surface processing element to the pulse neutron │
│                         generator and the detector;                1403 │
└─────────────────────────────────────────────────────────────────────────┘

┌─────────────────────────────────────────────────────────────────────────┐
│         Synchronizing the pulse neutron generator with the detectors over the network; │
│                                                                    1404 │
└─────────────────────────────────────────────────────────────────────────┘

┌─────────────────────────────────────────────────────────────────────────┐
│         Emitting neutrons into the formation with the pulse neutron generator while drilling; │
│                                                                    1405 │
└─────────────────────────────────────────────────────────────────────────┘

┌─────────────────────────────────────────────────────────────────────────┐
│     Measuring a formation response to the emitted neutrons through the detectors while │
│                                  drilling;                         1406 │
└─────────────────────────────────────────────────────────────────────────┘

┌─────────────────────────────────────────────────────────────────────────┐
│     Transmitting the measurements from the detectors to the surface processing element │
│                       over the network while drilling.             1407 │
└─────────────────────────────────────────────────────────────────────────┘
```

Fig. 14

DOWNHOLE COVER

CROSS REFERENCE TO RELATED APPLICATIONS

This application is a continuation of U.S. patent application Ser. No. 12/339,388, filed on Dec. 19, 2008 and entitled Downhole Nuclear Tool. This application claims priority to U.S. patent application Ser. No. 12/339,388, which is also herein incorporated by reference for all that it contains.

BACKGROUND OF THE INVENTION

This invention relates to downhole drilling, specifically downhole drilling for oil, gas, geothermal and horizontal drilling. More specifically, the invention relates to logging-while-drilling methods using a pulse neutron generator and detectors. Also, the invention relates to a method for a secondary nuclear measurement while drilling.

The prior art discloses several improvements for obtaining nuclear measurements downhole. U.S. Pat. No. 7,284,605, which is herein incorporated by reference for all that it contains, discloses a method for reducing stand-off effects of a downhole tool includes disposing the downhole tool in a borehole, wherein the downhole tool comprises at least one moveable section disposed between an energy source and a receiver on the downhole tool; and activating the at least one moveable section to reduce a thickness of at least one selected from a mud layer and a mudcake between the downhole tool and a wall of the borehole.

U.S. Pat. No. 6,666,285, which is herein incorporated by reference for all that it contains, discloses a logging-while-drilling gamma ray back scatter density system with elements configured to minimize material between sensor and the borehole environs, maximize shielding and collimation efficiency, and increase operational reliability and ruggedness. The system comprises a drill collar with a cavity in the outer wall, and an instrument package containing a sensor. The instrument package is disposed in the cavity and protrudes from the outer wall of the collar. Embodied as a density LWD system, the sensor consists of a gamma ray source and two detectors mounted within an instrument package framework made of high Z shielding material. A stabilized containing an alignment channel in the inner surface is disposed around the collar and receives the protrusion.

U.S. Pat. No. 5,250,806, which is herein incorporated by reference for all that it contains, discloses an apparatus and method for measuring density, porosity and other formation characteristics while drilling is disclosed. The apparatus, preferably housed in a drill collar and placed within a drill string, includes a source of neutrons and a source of gamma rays placed within a tubular body which is adapted to provide for the flow of drilling through it. Two sets of stabilizer blades are provided. One set, associated with the neutron source, includes secondary radiation detectors that are placed radially beyond the nominal outer radius of the body. Formation porosity measurement accuracy is substantially enhanced since the standoff of the detectors from the formation is substantially decreased. Another set, associated with the gamma ray source, includes one or more gamma ray detection assemblies in a single blade. Each of the gamma ray detector assemblies is also placed radially beyond the nominal outer radius of the tubular wall.

U.S. Pat. No. 5,250,806, which is herein incorporated by reference for all that it contains, discloses an extending arm is incorporated into a formation evaluation MWD collar or sub for extending outwardly from the tool and maintaining direct and continuous contact with the borehole wall (e.g, formation). In accordance with this invention, a method is presented for intermittently deploying the extendable arm and thereby decreasing drilling interference (caused by the arm) and avoiding the damage caused by accidents involving a nuclear source.

The prior art also discloses means for securing equipment in downhole tool string components, such as that disclosed in U.S. Pat. No. 7,299,867, which is herein incorporated by reference for all that it contains. This patent discloses a hanger mounted within a bore of a tubular string component has a split ring, a tapered key and a passageway formed in the hanger. The split ring has interfacial surfaces cooperating with interfacial surfaces of the tapered key.

BRIEF SUMMARY OF THE INVENTION

In one aspect of the invention, a downhole tool string component comprises a tubular body with a first and a second tool joint adapted to connect to adjacent tool string components and a central bore adapted to pass drilling mud between the joints and a sleeve circumferentially disposed about an outer surface of the tubular body. The sleeve is rigidly attached to the outer surface at first and second sleeve ends and forms at least three stabilizer blades. A nuclear source and at least one nuclear detector are disposed within a gap formed between the inner surface of the sleeve and the outer surface of the tubular body. The tubular body may comprise a substantially uniform thickness between the bore and its outer surface along a length of the tubular body defined by the sleeve.

The nuclear source may be a pulse neutron generator in communication with a downhole generator driven by a drilling mud turbine. The thickness of the tubular body may be made of steel and a portion of the body proximate the neutron source comprises a thickness that inherently shields neutrons from penetrating into the bore. The neutron source may be at least partially disposed within a pocket formed in the inner surface of the sleeve and underneath one of the three stabilizer blades. The detectors may comprise the capability of distinguishing between neutrons and/or gamma rays of different magnitudes of energy. The nuclear source and detectors may be part of a downhole network incorporated within a tool string through a data coupler disposed within at least one of the tool joints of the tubular body. The nuclear source and the detectors may be synchronized with each other through the network. The tubular body may comprise a first modulus of elasticity and the sleeve may comprise a second modulus of elasticity, wherein the second modulus is 40 percent to 63 percent of the first modulus. The gap may comprise a near detector, a far detector, and an extra far detector axially aligned along the tubular body. At least one acoustic detector may also be disposed within the gap.

A method of making a secondary nuclear measurement while drilling may have the steps of providing a downhole tool string comprising a drill bit, a plurality of interconnected tool string components, a pulse neutron generator and a nuclear detector disposed within stabilizer assembly associated with one of the tool string components; providing a surface processing element capable of calculating downhole measurement; providing a network connecting the surface processing element to the pulse neutron generator and the detector; synchronizing the pulse neutron generator with the detectors over the network; emitting neutrons into the formation with the pulse neutron generator while drilling; measuring a formation response to the emitted neutrons through the detectors while drilling; and transmitting the measurements from the detectors to the surface processing element over the network while drilling.

Also, the pulse neutron generator may be powered by a downhole mud drive generator. The network may comprise a surface wireless connection, a satellite, a surface local area network, a surface wide area network, or combinations thereof. The network may comprise at least one data coupler disposed within shoulders of tool joints of the plurality of interconnected tool string components. The data coupler may be disposed within a recess formed in a shoulder of the tool joint and may comprise a coil disposed within a magnetically conductive, electrically insulating trough. The detectors may be turned on at the same time the pulse neutron generator emits the neutrons. The detectors may also be turned on at a pre-determined time after the pulse neutron generator emits the neutrons. The measurement may include a time lapse between the time of neutron emission and at least one measurement recorded by the detectors. The measurements may be analyzed in real-time while drilling and wherein the processing element may automatically make a drilling recommendation based off an analysis of the measurements. The processing element may automatically execute a command to drilling equipment to carry out the recommendation.

BRIEF DESCRIPTION OF THE DRAWINGS

FIG. 14 is a flow diagram of another embodiment of a method of downhole logging while drilling.

DETAILED DESCRIPTION OF THE INVENTION AND THE PREFERRED EMBODIMENT

Figure 1:
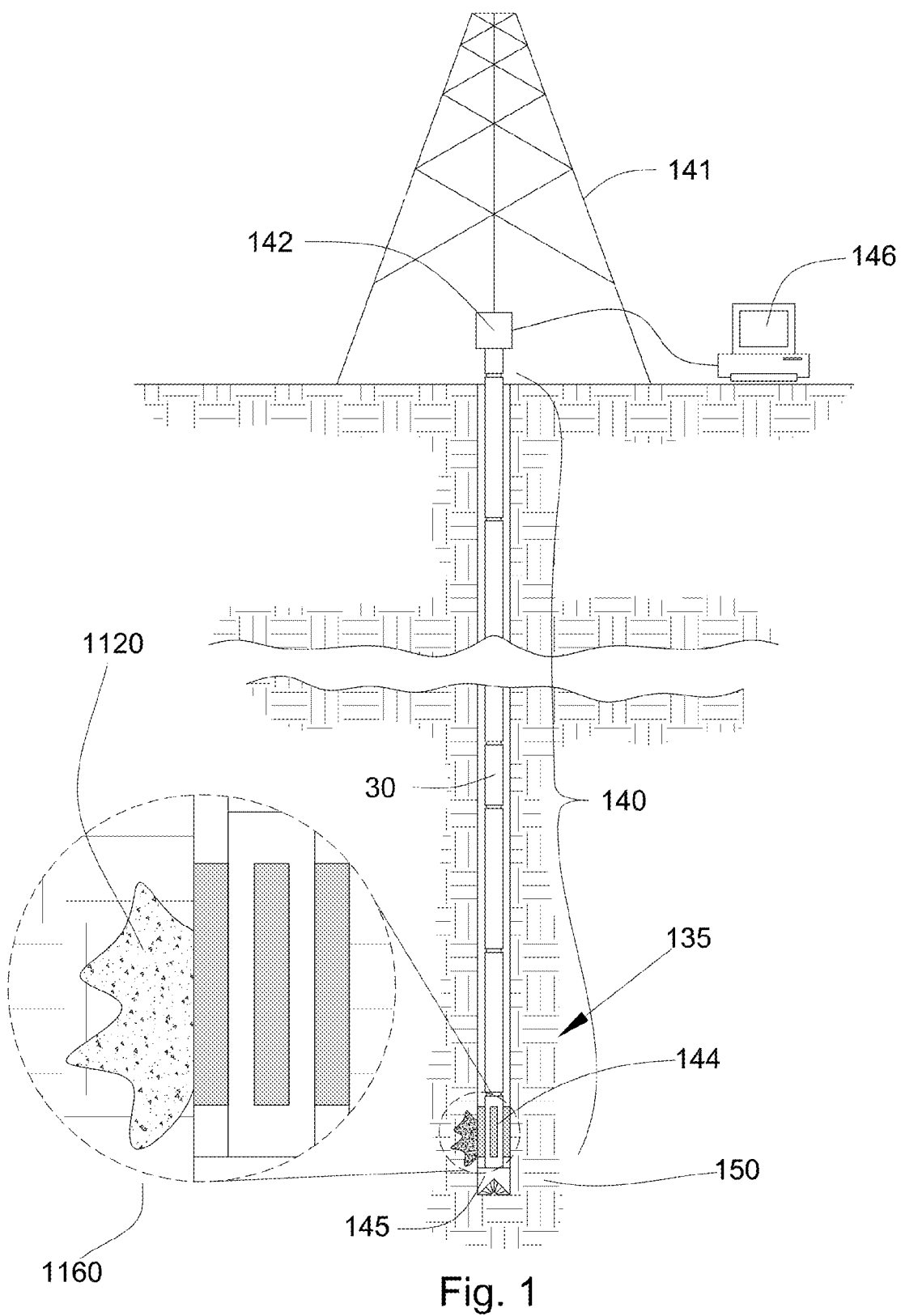
FIG. 1 is a perspective diagram of an embodiment of a tool string suspended in a borehole.

FIG. 1 is a diagram of an embodiment of a tool string 140 suspended by a derrick 141. A bottom hole assembly 144 is located at the bottom of a bore hole 143 and comprises a drill bit 145. As the drill bit 145 rotates downhole the tool string 140 advance further into the earth. The bottom hole assembly 144 and/or downhole tools 30, such as drill pipes, may comprise data acquisition devices which may gather data. The data may be sent to the surface via a transmission system to a data swivel 142. The data swivel 142 may send the data to the surface equipment 146. Further, the surface equipment 146 may send data and/or power to downhole tools 30 and/or the bottom-hole assembly 144. In some embodiments of the invention, the downhole tool string does not incorporate a downhole telemetry system connecting the downhole tools to surface equipment. An enlarged view 1160 discloses a nuclear cloud 1120 in the formation produced by pulse neutron generator a downhole tool.

Figure 2:
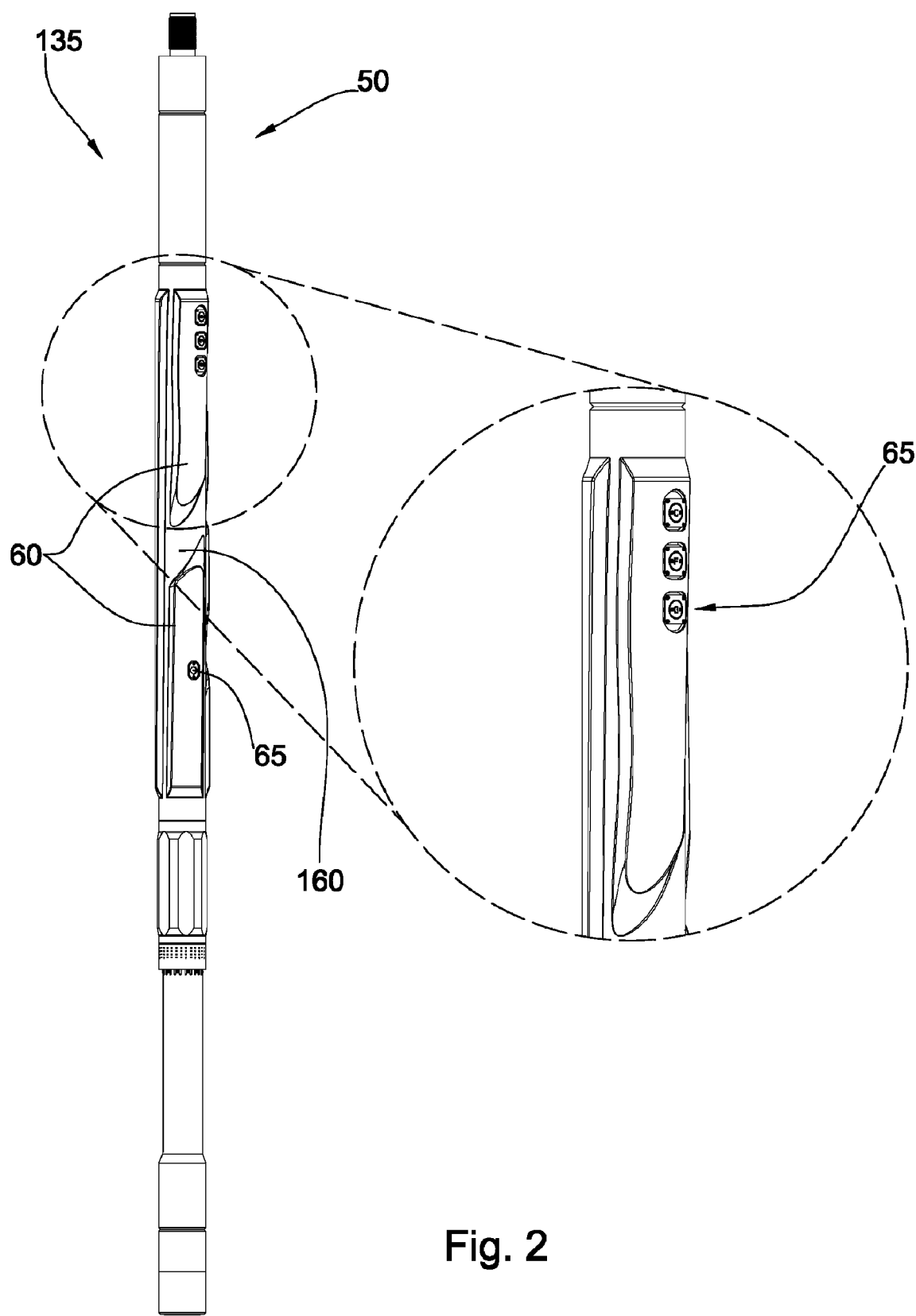
FIG. 2 is a perspective diagram of an embodiment of a tool string component.

FIG. 2 is a perspective diagram of an embodiment of a tool string component 50. The tool string component 50 may comprise downhole logging-while-drilling (LWD) and/or measurement-while-drilling (MWD) tools such as nuclear tools, seismic tools, resistivity tools, and/or acoustic tools. The component 50 may comprise stabilizer blades 60 disposed on its exterior surface. The stabilizer blades 60 may be adapted to centralize the tool string component 50 within the borehole wall while drilling. The stabilizer blades 60 may house a nuclear tool adapted to take measurements of the formation. The stabilizer assembly 135 may have an opening 160 separating the blade 60 into first and second portions. Often in downhole drilling applications subterranean formations 150 may dictate drilling along deviated paths to avoid hazards or to improve payload production. The opening 160 may reduce the stiffness of the stabilizer assembly 135 allowing it to more easily follow a deviated path through the formation. Geophone, hydrophone, and/or caliper ports 65 may be included on the tool string component 50.

Figure 3:
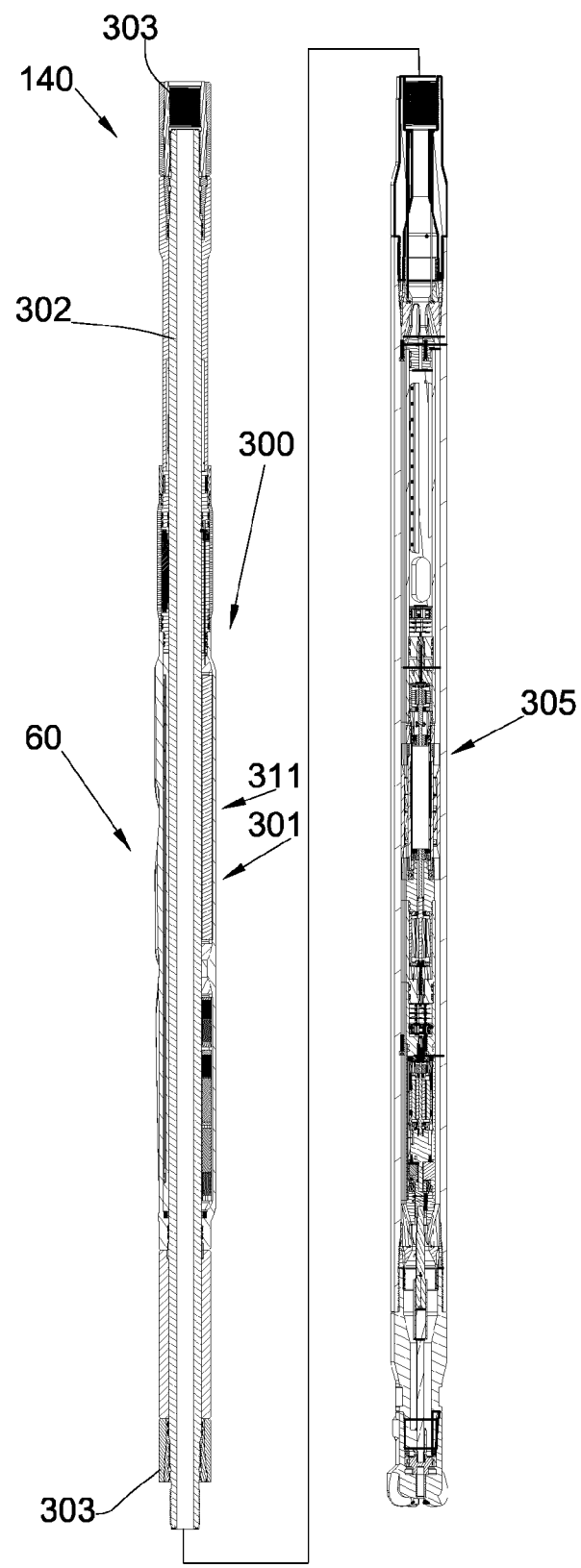
FIG. 3 is a cross-sectional diagram of an embodiment of a tool string assembly.

FIG. 3 is a cross-sectional diagram of an embodiment of a portion of a tool string 140. The stabilizer assembly 135 may comprise a sleeve 311 slideably attached to a tubular body 302 proximate its tool joints 303. The sleeve 311 may have at least one stabilizer blade 60 that generally follows the length of the sleeve 311 and extends outward from the center axis of the tubular body 302. A gap 301 formed between the sleeve 311 and the tubular body 302 may be adapted to accommodate a downhole tool such as nuclear sources, nuclear detectors, seismic sources, geophones, hydrophones, piezoelectric stacks, and/or resistivity related devices. In the embodiment of FIG. 3, a nuclear tool 300 is disposed within the gap 301, and a power generator 305 is located within the bore of the tubular body. The generator 305 may be driven by a positive displacement motor, a turbine, the mud flow, or combinations thereof.

A diameter formed by the distal ends of the stabilizer blades may be slightly less than the diameter of the bore hole, thus, causing that the distal surfaces of the stabilizer blades to be substantially in continuous contact with the bore hole wall and minimizing the distance between the instrumentation and the formation. An arrangement that may be compatible with the present invention is disclosed in U.S. patent application Ser. No. 11/828,901, which is herein incorporated by reference for all that it contains.

Figure 4:
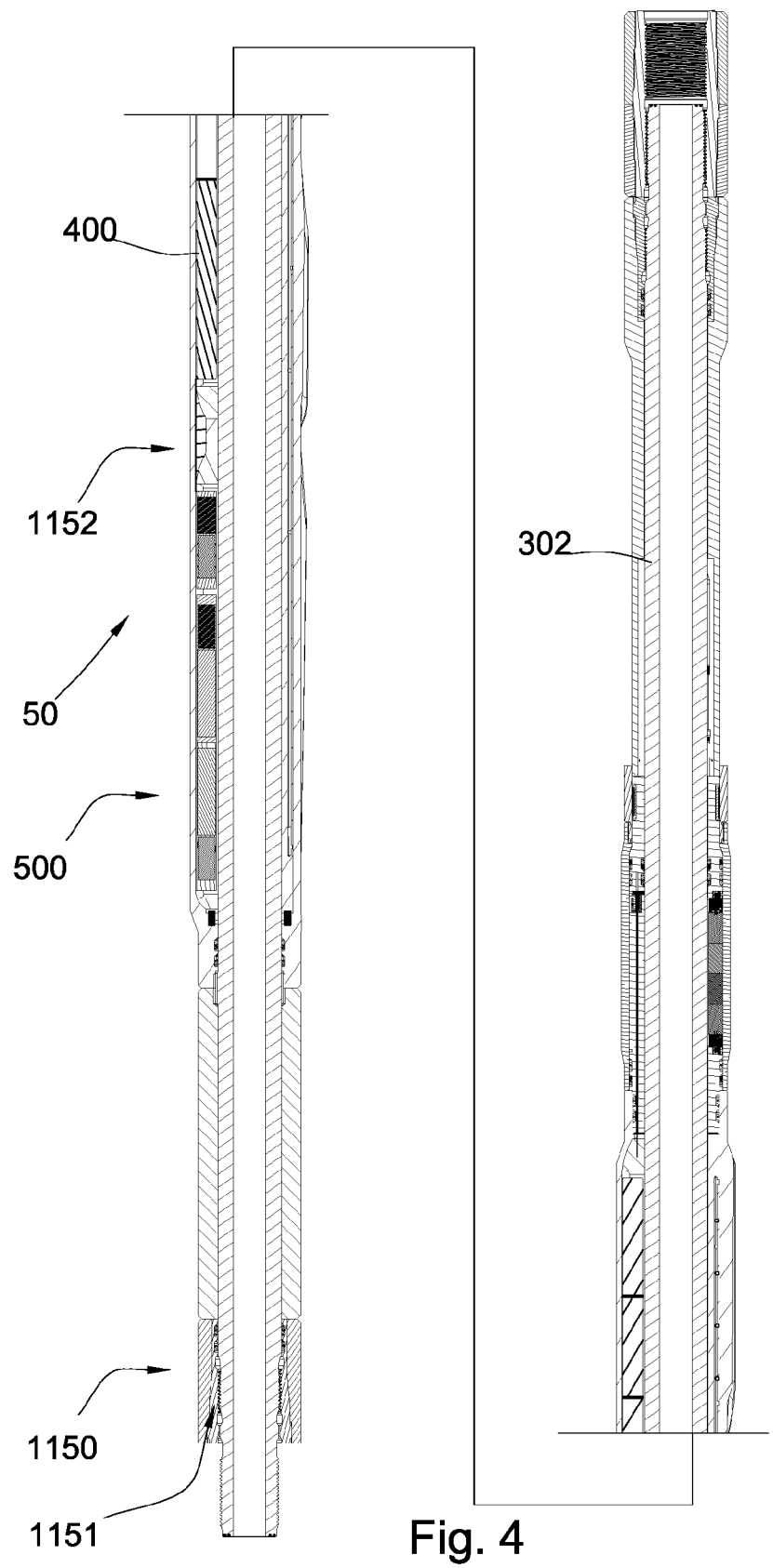
FIG. 4 is a cross-sectional diagram of an embodiment of a tool string component.

FIG. 4 is a cross-sectional diagram of an embodiment of a tool string component 50. The nuclear tool comprises a pulse neutron generator (PNG) 400, which is adapted to send neutrons into a surrounding formation, and a detector assembly 500, which are adapted to sense subatomic particles that travel back to the tool string component. The gap that contains the PNG may be adapted such that the emitted neutrons are inherently shielded from entering the bore of the tool string. This may be accomplished by providing the tubular body 302 with a large enough thickness to deflect the emitted neutron. This may be advantageous because it may reduce the nuclear reactions that occur in the drilling mud, thereby, allowing the detectors to obtain a more accurate reading of the formation. The sleeve may be thin enough to allow the neutrons to travel though it and into the formation. The sleeve may also be secured to the tubular body 302 through a sleeve anchor 1150. The anchor may connect to the tubular body though a threadform 1151.

In the preferred embodiment, the sleeve is made of steel and comprises a similar modulus of elasticity as the tubular body.

In alternative embodiments, the sleeve and tubular body may comprise different moduli of elasticity. The tubular body may comprise a first modulus of elasticity and the sleeve may comprise a second modulus such that the second modulus is 40 percent to 63 percent of the first modulus. A lower modulus of elasticity may improve the downhole tool string component's overall ability to bend, especially when deviating the trajectory of the well bore. The sleeve may comprise titanium, carbon fiber, and/or copper. In some embodiments, the sleeve may be hard-faced. The melting point of the sleeve may be 1604 to 1660 degrees Celsius. The sleeves tensile strength may be 897 mega-Pascals to 1000 mega-Pascals. The density of the sleeve may be 0.14 lb/in$^3$ to 0.18 lb/in$^3$. In embodiments where the density of the sleeve is considerably lower than steel, a shield at a location 1152 between the detectors 500 and the nuclear source 400 may prevent the neutrons from traveling directly to the detectors. The shield may comprise a greater modulus of elasticity than the second modulus of elasticity. The shield may comprise carbide or steel and may be two to eight inches long. The shield may interrupt a direct path between the nuclear source and the detectors. In some embodiments, the shield may comprise stress relief grooves to increase its flexibility and allow it to bend with the material of the sleeve.

Figure 5A:
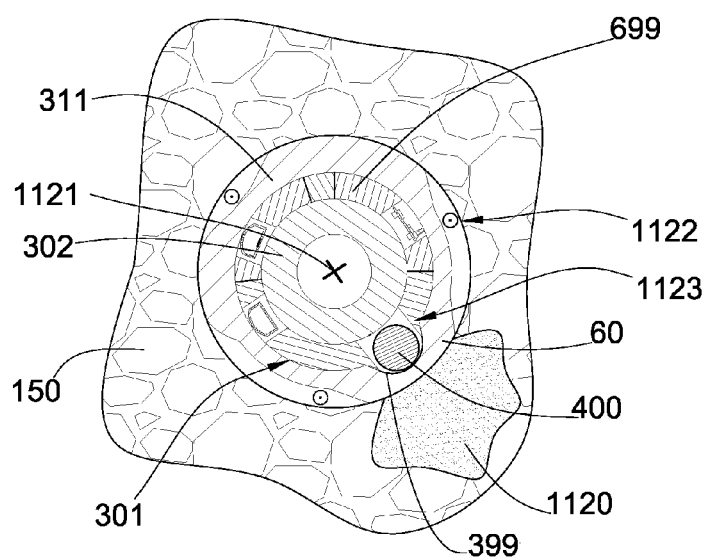
FIG. 5a is a cross-sectional diagram of another embodiment of a tool string component in a borehole.

FIG. 5a discloses a nuclear cloud 1120 in the formation 150. As the neutrons are emitted into the formation 150, the neutrons collide with atoms and various nuclear interactions occur, such as: elastic and inelastic neutron scattering, neutron capture, and fast-neutron reactions. Generally these reactions will result in emitted neutrons bouncing through the formation at reduced energy levels than when first emitted, and also gamma rays and other subatomic particles that are released during the nuclear interactions will bounce around within the formation. The neutrons and subatomic particles will travel in the various directions that they are deflected by the other atoms in the formation depending on the angle of their collisions and, thus, form a cloud 1120 of active subatomic particles.

The nuclear measurements may be performed while drilling mud is circulating through the wellbore as disclosed in FIG. 5a with a downward symbol 1121 representing fluid traveling down the bore, and the upward symbols 1122 representing the drilling mud traveling up the borehole in the annulus. Typically, some of the nuclear interactions occur within drilling mud disposed between the nuclear PNG 400 and the bore wall. Some of the drilling mud actually penetrates into cracks in the bore wall, requiring that the neutrons penetrate deeper into the formation to get a true measurement. A gap formed underneath a stabilizer blade, such as in the embodiment of FIG. 5a, is advantageous because it reduces the distance between the PNG and the bore hole wall, thus, allowing more of the neutrons to travel deeper into the formation.

A second tubular body 699 may be situated within the gap 301 between the sleeve 311 and the first tubular body 302. The second tubular body 699 may support the sleeve under downhole pressure, which has a propensity to collapse the sleeve into the gap, and may also house downhole instrumentation, such as the nuclear source and detectors, in pockets formed therein. The pocket may be aligned with a recess formed in the inner diameter of the sleeve and the instrumentation may be disposed within both the pocket and the recess. In some embodiments, the instrumentation may reside within a pocket 1123 of the second tubular body 699, a recess 399 of the sleeve 311, or combinations thereof.

Figure 5B:
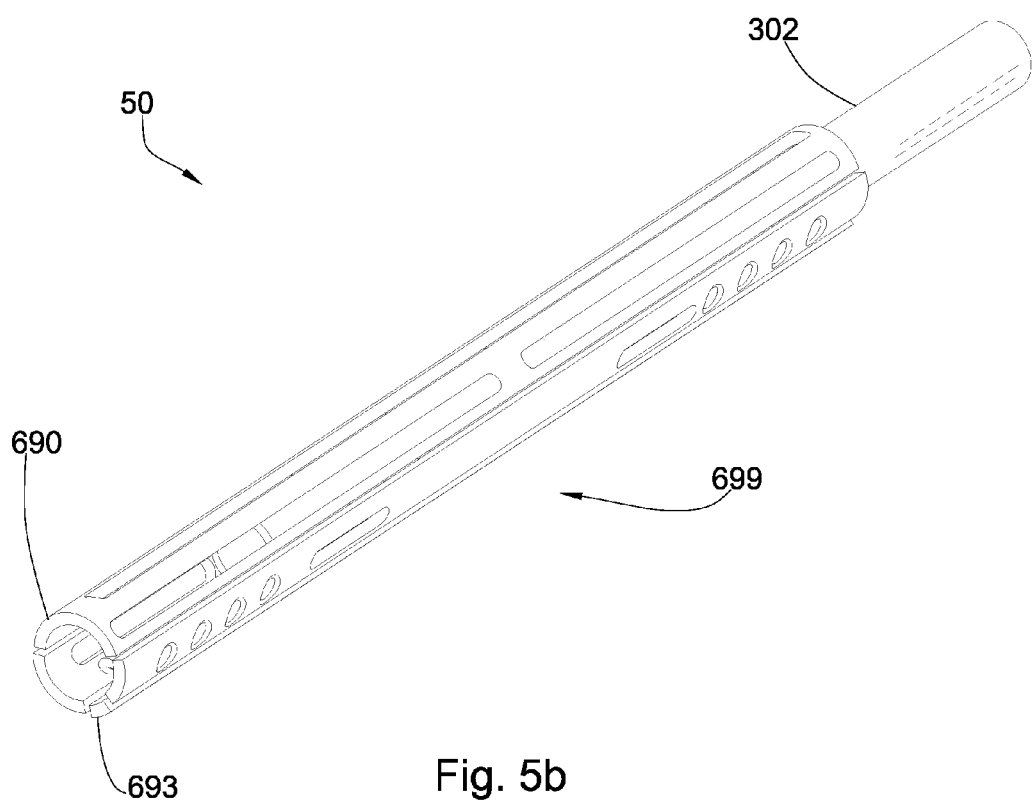
FIG. 5b is a perspective diagram of an embodiment of a tool string component.

FIG. 5b discloses a second tubular body 699 disposed about the tubular body without the sleeve for illustrative purposes. Pockets formed in the sleeve may go through the entire thickness of the second tubular body 699 or they may be formed only in a portion of the thickness. The second tubular body 699 may also be formed in axial segments 690, one of the segments being a keystone segment 693. In some embodiments of the present invention, there may be only two segments, one of which is the keystone segment 693.

Figure 5C:
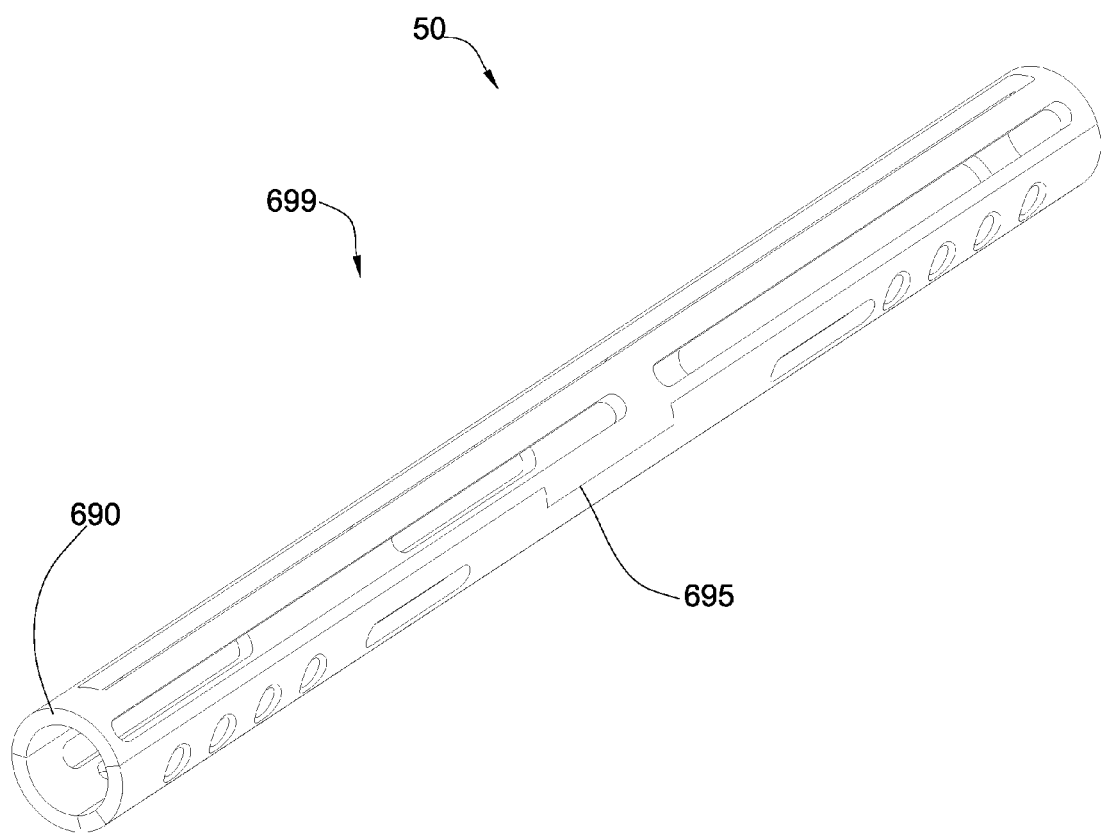
FIG. 5c is a perspective diagram of another embodiment of a tool string component.

The segments 690 may interlock with each other, as disclosed in FIG. 5c, through a locking feature 695 of the segment's length. The pockets may extend along the axis of the second tubular body a distance of five to seventy five percent of the tubular body's length. The second tubular body may comprise more than one pocket, each of which may house different instrumentation. The pockets may be in electrical communication with each other allowing the instrumentation to communicate with each other.

Figure 5D:
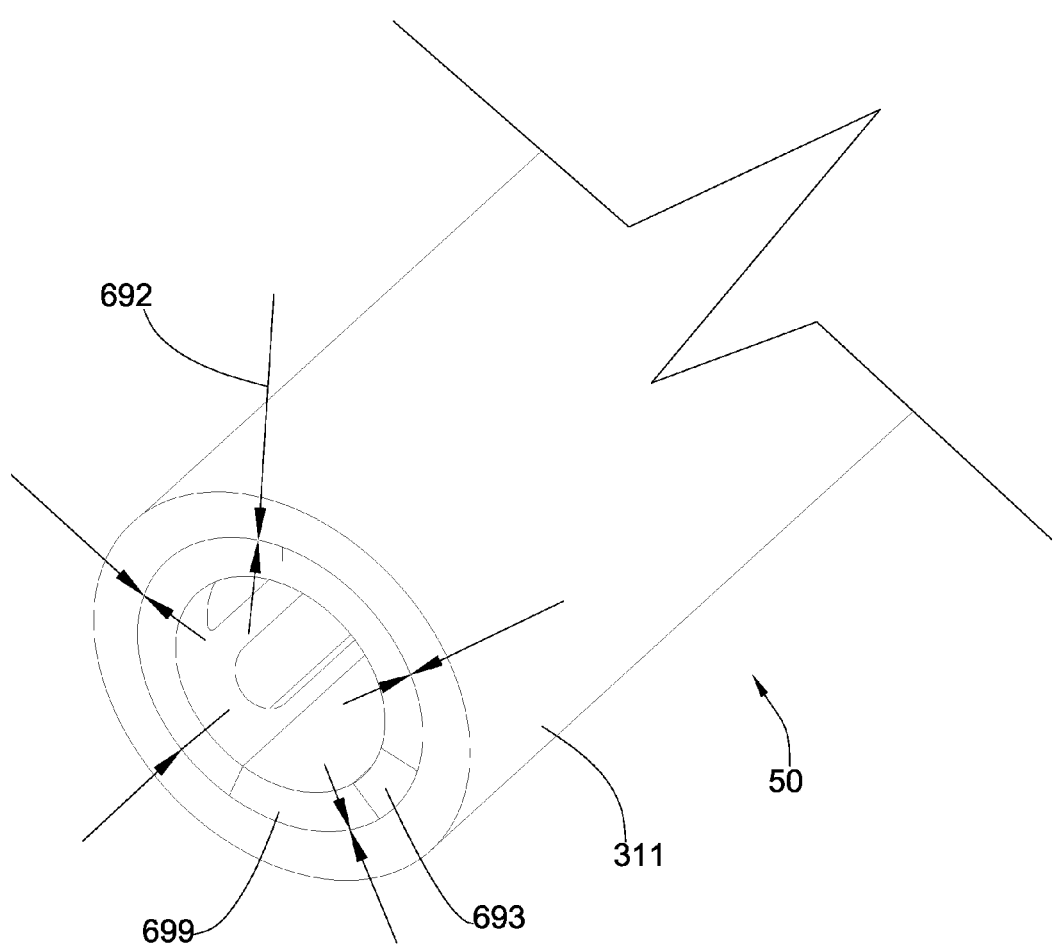
FIG. 5d is a perspective diagram of another embodiment of a tool string component.

FIG. 5d discloses second tubular body 699 held within the sleeve through a compression fit. During assembly, each segment 690 may be inserted into the sleeve 311 first. An expanding tool may be used to expand the inserted segments 690 for opening the space for the keystone segment 693. Once the keystone segment 693 is inserted the expanding tool may be relaxed and removed, leaving the second tubular body 699 in compression. Testing reveals that a compression fit as described comprises lower stress concentrations in the downhole tool component over embodiments where the second tubular body is not held in compression. Such an arrangement also allows less precision when making the various parts of the invention.

Figure 5E:
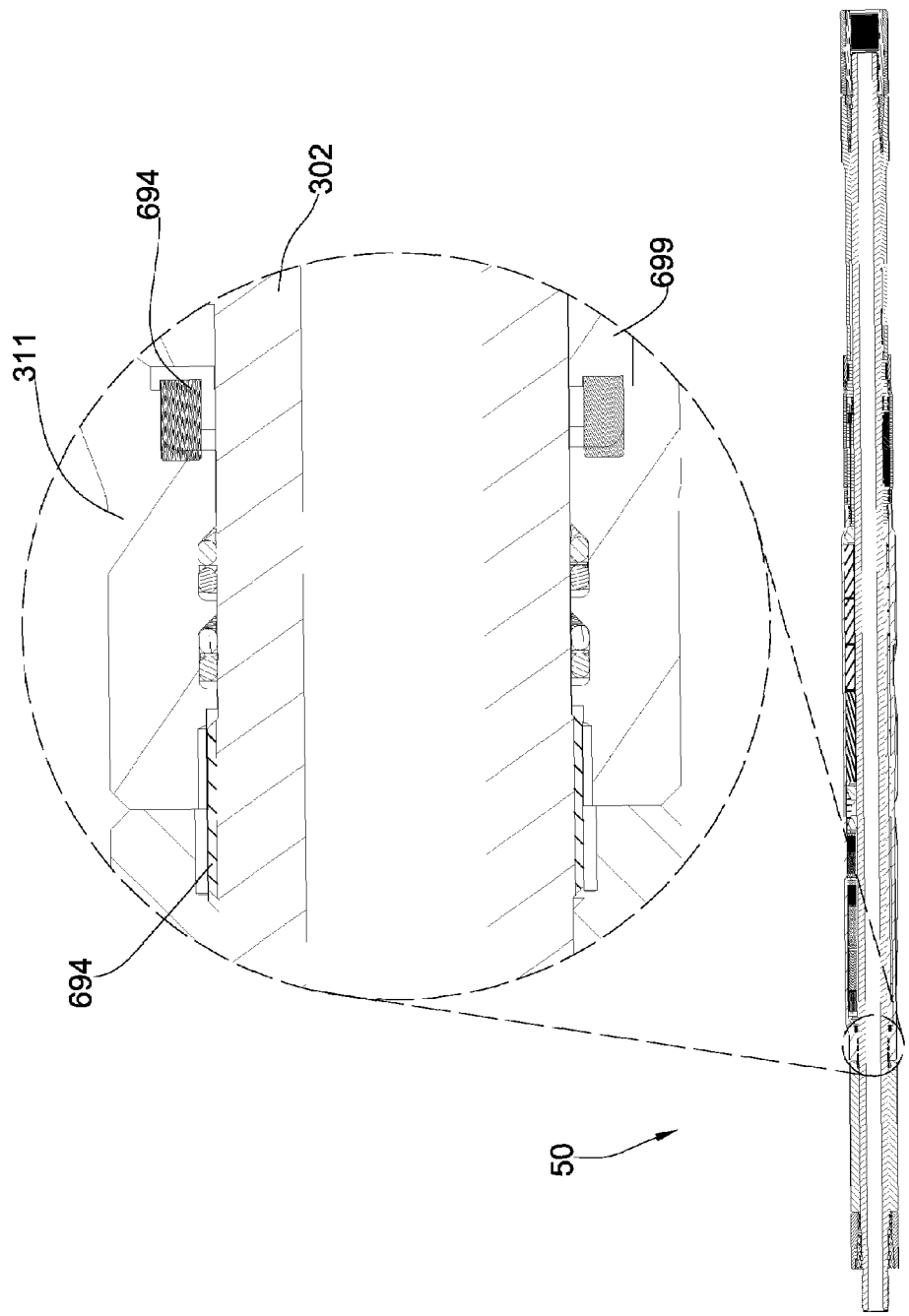
FIG. 5e is a cross-sectional diagram of an embodiment of a tool string component.

FIG. 5e discloses anti-rotation devices 694 adapted to restrict movement between combinations of the sleeve 311, the second tubular body, and the first tubular body. The anti-rotation devices may also comprise a tab, notch, protruding geometry, pins, inclined surfaces, wedges, or combinations thereof.

Figure 6:
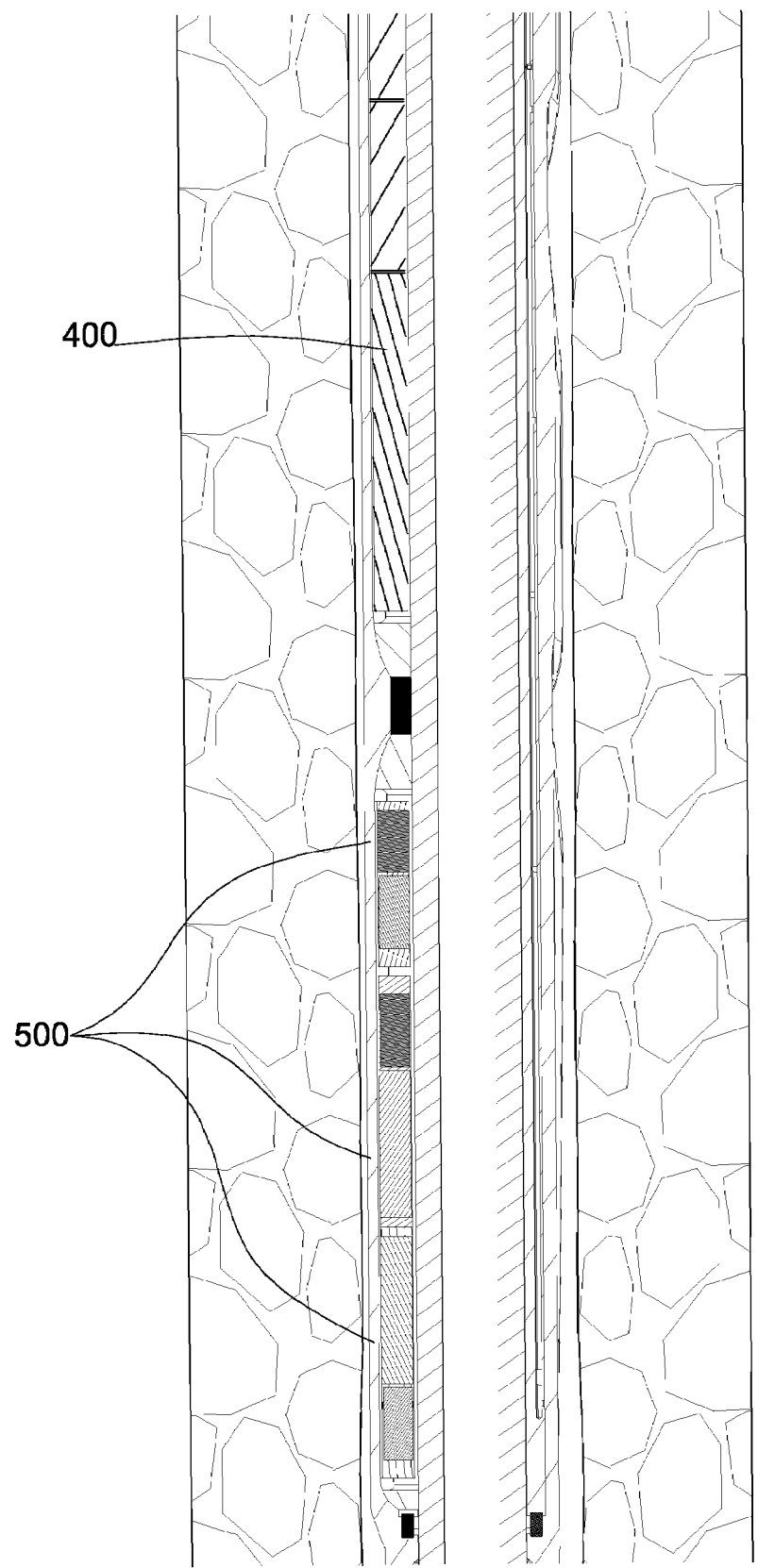
FIG. 6 is a cross-sectional diagram of another embodiment of a tool string component in a borehole.

In FIG. 6, a PNG 400 and a detector assembly 500 are disclosed in a downhole tool string component 50. The PNG and the detectors may be spaced under the same stabilizer blade or under separate blades. In some embodiments, the detectors and nuclear source are housed by different portions of the same stabilizer blade.

Figure 7:
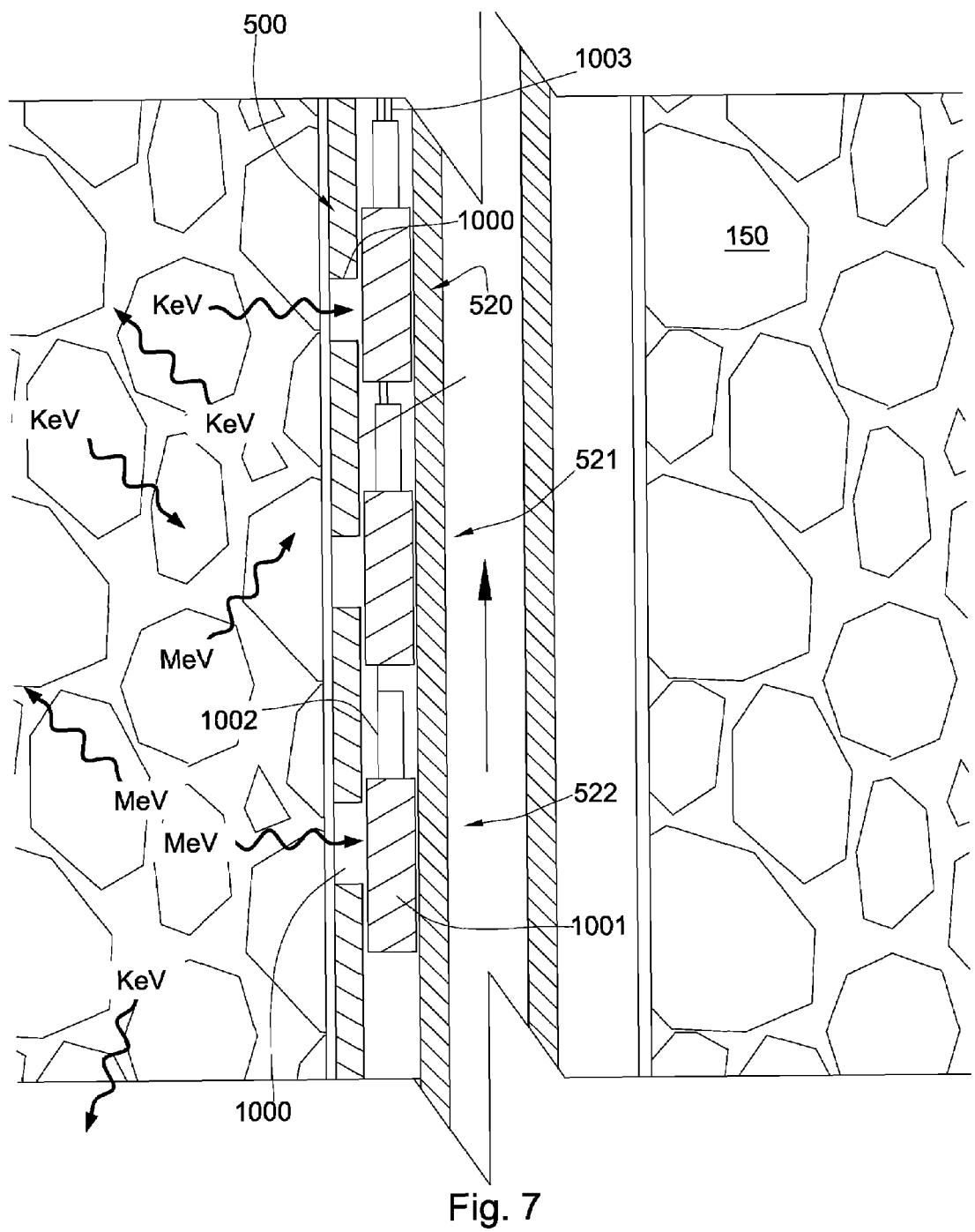
FIG. 7 is a cross-sectional diagram of another embodiment of a tool string component.

FIG. 7 discloses an embodiment of a detector assembly 500 disposed within the gap 301. The detector assembly 500 may be used to detect the porosity and/or density of the formation by counting the gamma rays and/or neutrons returning to the tool at the detectors. The sleeve 311 may comprise windows 1000 that are transparent to the subatomic particles allowing them to pass through to the detectors 500. Typically the energy levels for measurements for porosity are substantially higher than the energy levels for density measurements, and the detectors may be adapted to distinguish between them based on off of their energy levels.

The detector assembly 500 may comprise a near 520, far 521, and extra far detector 522. The extra far detector may be used to calibrate the measurements from the other detectors. Ratios calculated from the three detectors may help estimate the true porosity and/or density of the formation 150. The detector may comprise a scintillation material 1001, such as a phosphor, that comprises a characteristic of generating an electrical signal upon contact with the subatomic particles. Typically, the collision with the subatomic particles do not have enough energy to produce a signal large enough to be read by electronic devices, so a photomultiplier 1002 may be associated with at least one scintillation material 1001 to amplify the signals. Wires 1003 may connect the photomultipliers to electronic equipment downhole that may process the counts in real time.

Figure 8:
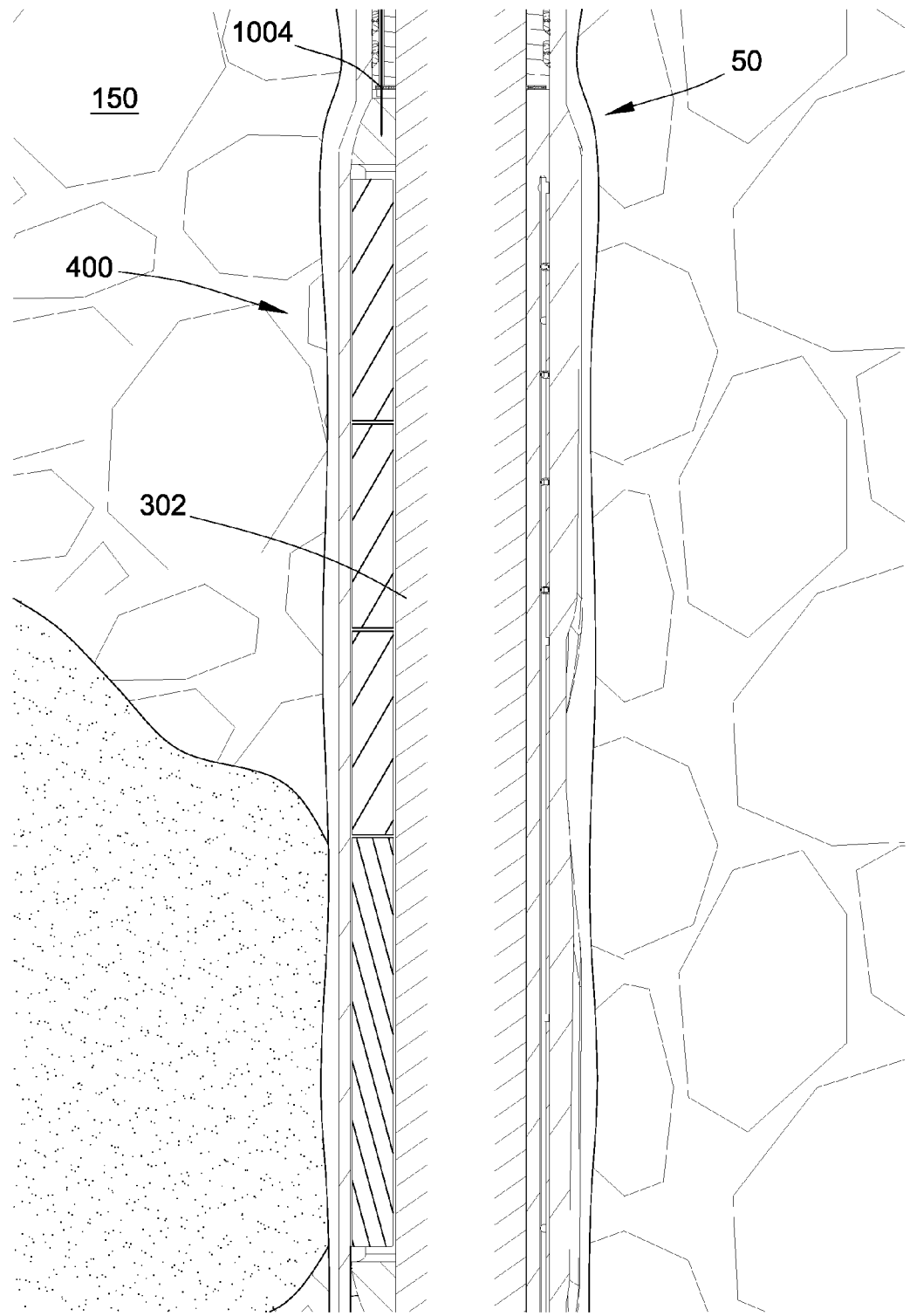
FIG. 8 is a cross-sectional diagram of another embodiment of a tool string component.

FIG. 8 discloses the PNG 400 in communication with a downhole network 1004. The network and/or the electrical components may actuate the PNG on and off, control the sample rate, the duration of each sampling, and other parameters associated with the PNG.

Figure 9:
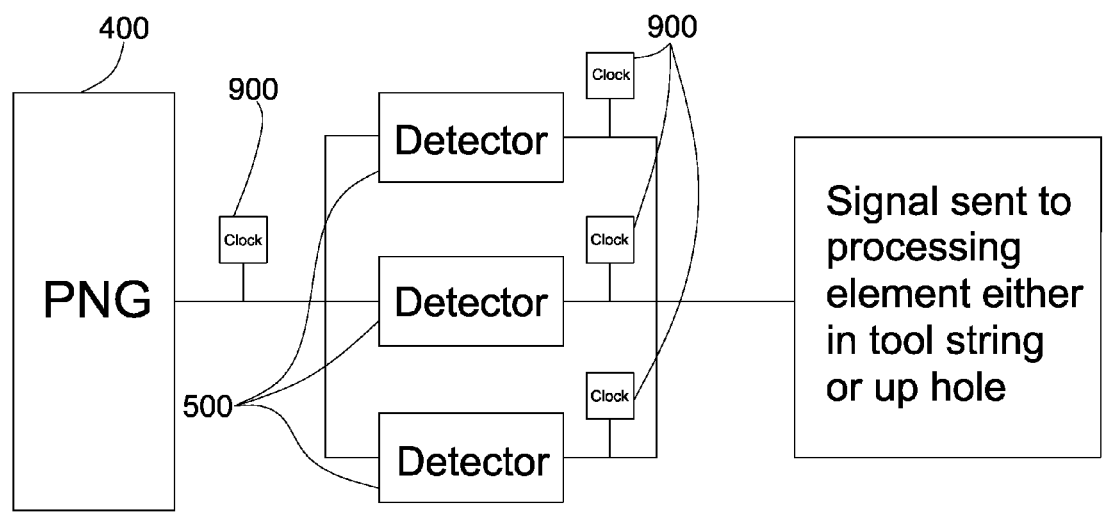
FIG. 9 is a diagram of an embodiment of drilling instrumentation.

FIG. 9 discloses the PNG 400 in communication with a downhole clock 900. The PNG 400 and the detector assembly 500 may be synchronized with each other through a network, a downhole processing element, a telemetry system, and/or a mud pulse system. The detector assembly 500 may also be turned on at the same time the PNG 400 emits neutrons, or the detector may be turned on a pre-determined time after the neutrons are emitted. The measurement may include a time lapse between the time of neutron emission and at least one measurement recorded by the detectors. Generally the detectors are passive, but the downhole clock source allows the detectors to receive improved accuracy in time stamping the emission and the detection of the subatomic particles. In some embodiments, the clocks share the same source, which may be located downhole or up-hole over a telemetry system. Generally, nuclear reactions occur within milliseconds from actuating the PNG, thus, the electronics controlling the detectors and PNG must be precise.

Figure 10:
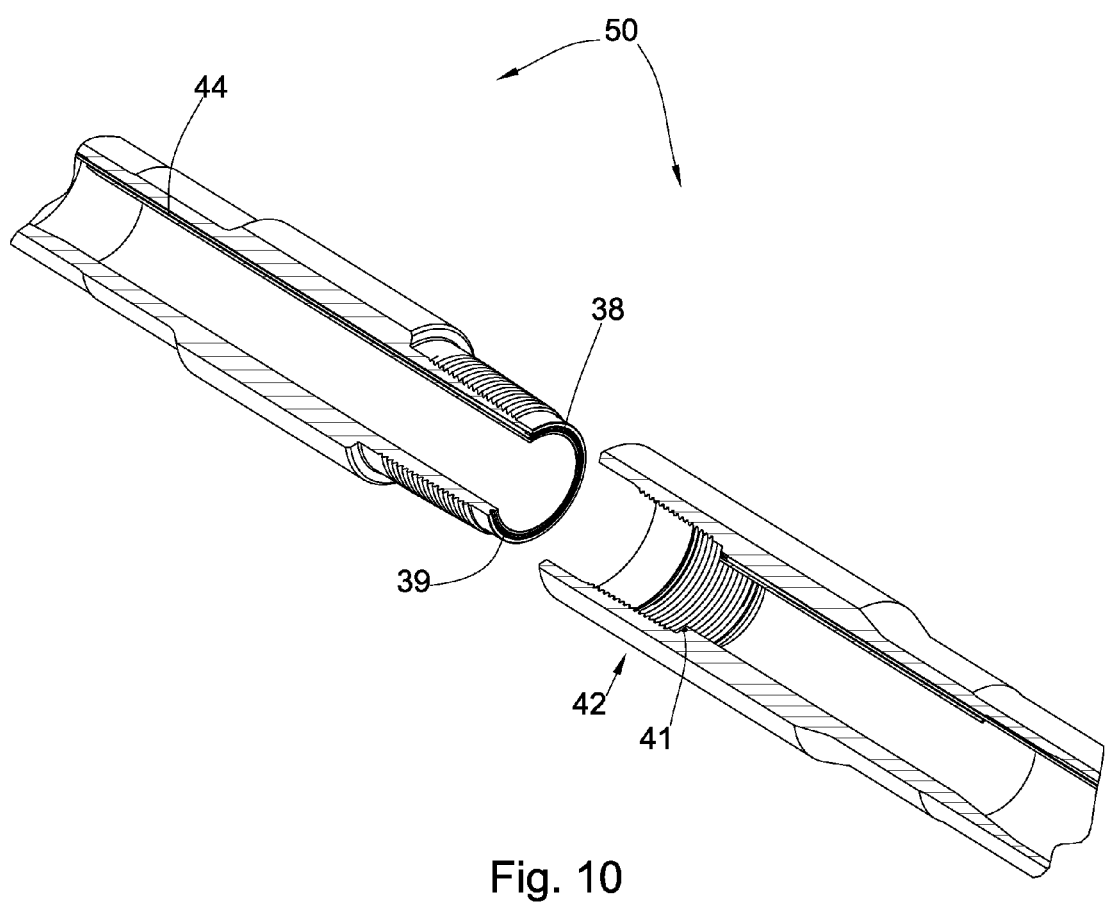
FIG. 10 is a perspective cross section of an embodiment of downhole components.
Figure 11:
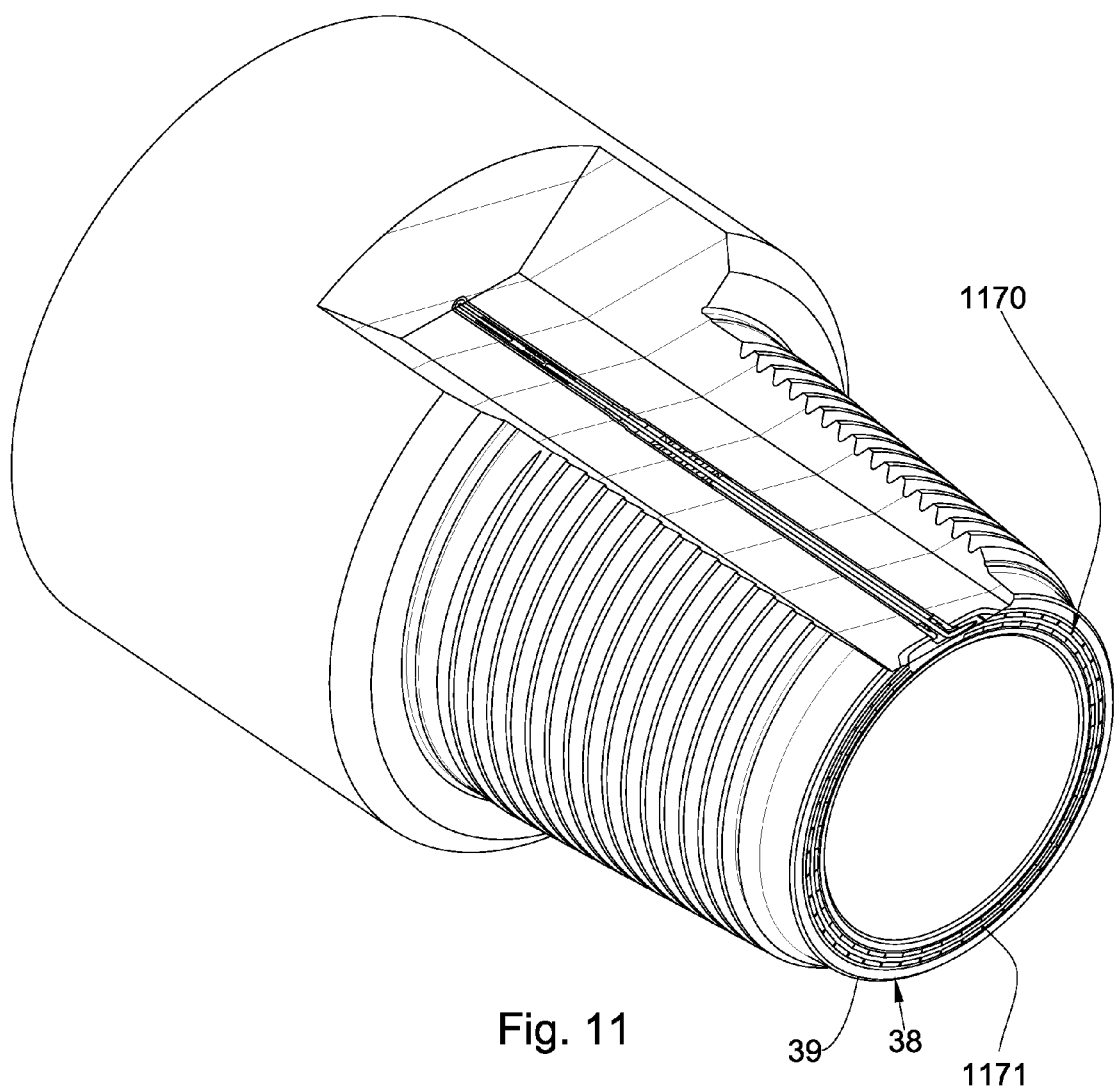
FIG. 11 is a perspective cut-away of an embodiment of a downhole component.

FIGS. 10 and 11 disclose parts of a downhole network that may be compatible with the present invention. One such network is described in U.S. Pat. No. 6,670,880, which is herein incorporated by reference for all that it teaches. The parts may include data transmission elements 38 located in a secondary shoulder 39 of a pin end 40 and in a secondary shoulder 41 of a box end 42 of tool string component. The data transmission elements 38 are connected by an electrical conductor 44 that runs through the central bore of the tool string component. In the preferred embodiment, the electrical conductor is a coaxial cable that is under tension. The network may extend from the tool string component at the surface and incorporate a satellite, a surface local area network, a surface wide area network, wireless connections or combinations thereof. With such an expanded network, the data from the detectors may be forwarded to equipment located on site or to any location around the world for analysis.

FIG. 11 discloses the transmission elements 38 formed in grooves in the secondary shoulders 39 of the tool joints. The transmission elements may comprise a coil 1170 disposed in segmented circular trough 1171 of magnetically-conductive, electrically-insulating material. The coil is also in electrically communication with the electrical conductor through a lead wire 59 coming off of the coil. The magnetizable element may be constructed out of a highly permeable and ductile material typically associated with the class of soft magnetic materials.

Figure 12:
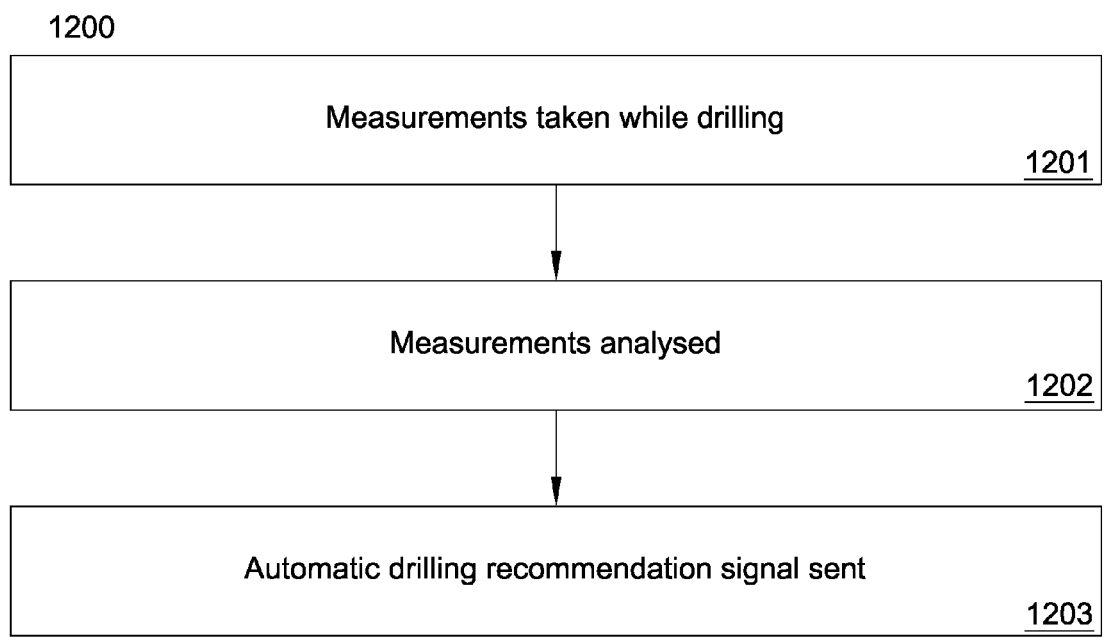
FIG. 12 is a flow diagram of an embodiment of a method of downhole logging while drilling.

FIG. 12 is a block diagram of an embodiment of a method for measuring while drilling 1200. The steps include: recording downhole drilling measurements starting with taking the measurements while drilling 1201, analyzing the measurements 1202, and then sending the signal automatically to data storage/processing elements 1203.

Figure 13:
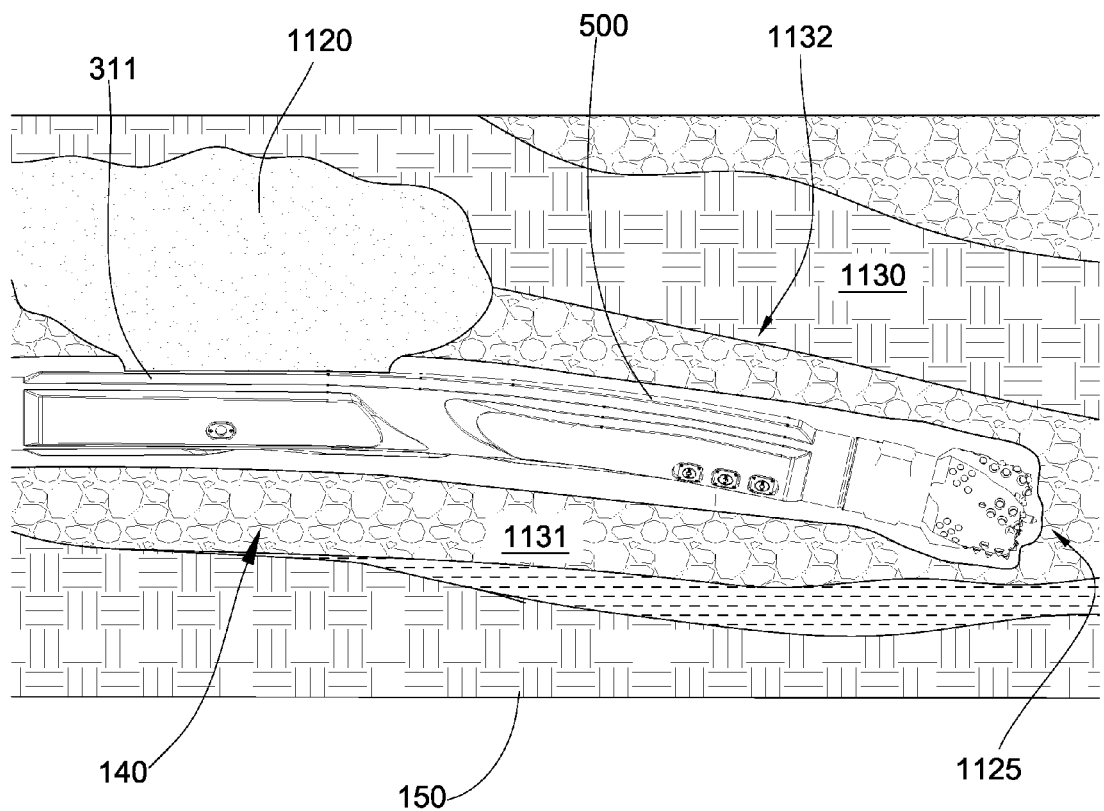
FIG. 13 is a perspective diagram of an embodiment of a tool string in a borehole.

In FIG. 13, a PNG and a detector assembly (see FIG. 8) are located underneath the sleeve 311 proximate the nuclear cloud 1120. The measurements may be analyzed in real-time while drilling and a processing element may automatically make drilling recommendations based off the measurements. The processing element may also automatically execute a command to drilling equipment to carry out the recommendation. Raw data, modified data, filtered data, and/or compressed data obtained by the detectors may be sent up-hole by a telemetry system and the calculations may be made at the surface. The nuclear measurements may help indentify boundaries 1132 between subterranean strata 1130, 1131. Such identifications may be useful in geo-steering applications where it is desirable to stay within an oil bearing strata 1131. The drilling equipment may control the trajectory of the tool string, mud flow, weight on bit, tool string RPM, firing rate of downhole tools, other LWD or MWD tools, and/or power generation. In some embodiments, the tool string's rate of penetration and RPM may be monitored, which data may be coordinated with nuclear tool's activity. In some embodiments, the life of the nuclear source may be prolonged by reducing the firing rate of the nuclear tool in appropriate situations. Such situations may include slower RPM and/or ROP, investigation of a formation of a lower interest, or combinations thereof.

A rotary steerable system may be in communication with the processing element, and may change the drilling trajectory based off of input from the tools. The rotary steerable system may comprise an indenter 1125 that protrudes beyond the working portion of the bit. The indenter 1125 may be adapted to lead the bit along the desired trajectory. A rotary steerable system that may be compatible with the present invention is disclosed in U.S. Pat. No. 7,360,610, which is herein incorporated by reference for all that it discloses.

FIG. 14 is a block diagram of an embodiment of a method for making secondary measurement while drilling. The method may include the steps of: providing 1401 a downhole tool string comprising a drill bit, a plurality of interconnected tool string components, a PNG, and a nuclear detector disposed within a stabilizer assembly associated with one of the tool string components; providing 1402 a surface processing element capable of calculating downhole measurements; providing 1403 a network connecting the surface processing element to the PNG and the detector; synchronizing 1404 the PNG with the detectors over the network; emitting 1405 neutrons into the formation with the PNG while drilling; measuring 1406 a formation response to the emitted neutrons through the detectors while drilling; and transmitting 1407 the measurements from the detectors to the surface processing element over the network while drilling.

Whereas the present invention has been described in particular relation to the drawings attached hereto, it should be understood that other and further modifications apart from those shown or suggested herein, may be made within the scope and spirit of the present invention.

What is claimed is:

1. A downhole tool string component, comprising:
a tubular body comprising a central bore, the tubular body comprising an inner and outer diameter;
a sleeve disposed over the tubular body and connected thereto;
the tubular body is made of a first material comprising a first modulus of elasticity and the sleeve is made of a second material with a second modulus of elasticity; and
wherein the second modulus of elasticity is 40 percent to 63 percent of the first modulus;
wherein the sleeve houses a pulse neutron generator;
wherein the sleeve comprises a shield intermediate the pulse neutron generator and a nuclear detector wherein the shield comprises a modulus of elasticity greater than the second modulus of elasticity; and
wherein a direct path from the pulse neutron generator to the nuclear detector is interrupted by the shield;
wherein the shield comprises a plurality of grooves adapted to reduce stress risers when the shield is in compression or tension.

2. The component of claim 1, wherein the melting point of the sleeve is 1604 degrees Celsius to 1660 degrees Celsius.

3. The component of claim 1, wherein the tensile strength of the sleeve is 897 Megapascals to 1000 Megapascals.

4. The component of claim 1, wherein the density of the sleeve is 0.14 lb/in$^3$ to 0.18 lb/in$^3$.

5. The component of claim 1, wherein the sleeve comprises a stabilizer assembly.

6. The component of claim 1, wherein the shield is made of carbide or steel.

7. The component of claim 1, wherein the shield extends along the axis of the tubular body 2 inches to 8 inches.

8. The component of claim 1, wherein the sleeve is segmented.

9. The component of claim 1, wherein the sleeve is securely positioned intermediate the first and second ends of the tubular body by at least one sleeve anchor.

10. The component of claim 1, wherein the anchor is attached to the tubular body through a threadform.

11. The component of claim 1, wherein the second material comprises titanium.

12. The component of claim 1, wherein the second material is hard-faced.

13. The component of claim 1, wherein the second material comprises a carbon fiber.

14. The component of claim 1, wherein the sleeve is made of copper.

15. The component of claim 1, wherein at least one downhole instrument is surrounded by the sleeve.

16. The component of claim 15, wherein the at least one downhole instrument is in communication with a downhole network.

* * * * *